3,210,249
PHARMACEUTICAL COMPOSITION COMPRISING
7-METHOXY-17α-METHYL-TESTOSTERONE
Wolfgang Beerstecher, Harald Metz, and Klaus Bruckner, Darmstadt, Germany, assignors to Firma E. Merck, Aktiengesellschaft, Darmstadt, Germany
No Drawing. Filed Jan. 21, 1963, Ser. No. 252,578
Claims priority, application Germany, Feb. 1, 1962, M 51,645; Feb. 3, 1962, M 51,671
3 Claims. (Cl. 167—74)

This invention relates to new anabolically-active steroids which are substantially devoid of deleterious side reactions. More particularly, this invention relates to steroids of the androstane series.

Various anabolic agents have been suggested by the prior art; however, their usefulness has been limited in many instances by relatively serious side reactions.

The principal object of this invention, therefore, is to provide novel anabolically-active steroids substantially devoid of deleterious side reactions.

Another object is to provide novel intermediates for the preparation of these anabolically-active steroids.

Still another object is to provide processes for the preparation of these anabolically-active steroids.

Still further objects include pharmaceutical preparations and applications based on these new steroids.

Upon further study of the specification and appended claims, other objects and advantages of this invention will become apparent.

The novel steroids of this invention include compounds conforming to the following structural formula:

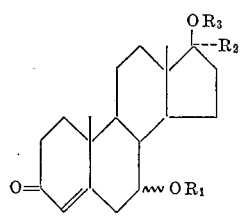

(I)

wherein $R_1$ represents methyl, ethyl or propyl,
$R_2$ represents methyl or ethyl, and
$R_3$ represents hydrogen or an alkanoyl radical of 1–6 carbon atoms;

and the 1-dehydro derivatives thereof.

The wavy line in the above formula, as well as in the structural formulae set forth infra, signifies that both α and β epimeric forms are within the scope of this invention. The different epimers may be separated by chromatography, for example, if desired.

The following specific compounds are exemplary of the novel steroids of this invention:

7-methoxy-17α-methyl-4-androstene-17β-ol-3-one
7-ethoxy-17α-methyl-4-androstene-17β-ol-3-one
7-propoxy-17α-methyl-4-androstene-17β-ol-one
7-isopropoxy-17α-methyl-4-androstene-17β-ol-one
7-methoxy-17α-ethyl-4-androstene-17β-ol-one
7-ethoxy-17α-ethyl-4-androstene-17β-ol-3-one
7-propoxy-17α-ethyl-4-androstene-17β-ol-3-one
7-isopropoxy-17α-ethyl-4-androstene-17β-ol-3-one 7-methoxy-17α-methyl-1,4-androstadiene-17β-ol-3-one
7-ethoxy-17α-methyl-1,4-androstadiene-17β-ol-3-one
7-propoxy-17α-methyl-1,4-androstadiene-17β-ol-3-one
7-isopropoxy-17α-methyl-1,4-androstadiene-17β-ol-3-one 7-methoxy-17α-ethyl-1,4-androstadiene-17β-ol-3-one
7-ethoxy-17α-ethyl-1,4-androstadiene-17β-ol-3-one
7-propoxy-17α-ethyl-1,4-androstadiene-17β-ol-3-one
7-isopropoxy-17α-ethyl-1,4-androstadiene-17β-ol-3-one and the formiates, acetates, propionates, butyrates, isobutyrates, valerates, isovalerates, pivalates, caproates and tert.-butylacetates of the compounds above.

These new compounds can be compounded with the excipients, auxiliary agents, carriers, etc., which are usually employed to form anabolic preparations for the treatment of mammals. As carrier materials, use can be made of such organic or inorganic substances as are suitable for parenteral, peroral or topical application and which, of course, are inert to the new compounds, as for example water, vegetable oils, polyethylene glycol, gelatin, lactose, starch, magnesium stearate, talc, vaseline, cholesterol, etc. For parenteral application, suitable materials are solutions, preferably oily or aqueous solutions, and also suspensions, emulsions and implantations. For peroral application, tablets or dragees can be used, while for topical application salves or cremes are used which may have been sterilized or mixed with supplementary materials such as preservatives, stabilizers, wetting agents, salts, to influence the osmotic pressure or buffer substances. In general, a unit dosage will comprise about 1–10 mg. of the steroid. The preferred amount of carrier per unit dosage ranges from about 100 to 1000 mg.

The following table illustrates the anabolic activity of a representative steroid of this invention—

TABLE.—RATIO OF ANABOLIC/ANDROGENIC ACTIVITY

| Dose per animal (orally) | 1 mg. | 5 mg. | 10 mg. |
| --- | --- | --- | --- |
| 7-methoxy-17α-methyl-testosterone | 33 | 22 | 13.7 |
| 17α-methyl-testosterone | 1 | 1 | 1 |

The anabolic actiivty was determined by measuring the percent increase in weight of the musculus levator ani in rats. The androgenic activity was determined by measuring the percent increase in weight of the seminal vesicle in rats. The method of determination is that of Hershberger et al. described in Proceedings of the Society for Experimental Biology and Medicine, volume 83, page 175 (1953). The anabolic-androgenic ratios thus obtained are compared to those of the well-known anabolic parent compound methyl-testosterone the ratio of which is assumed to be 1.

The new steroids of this invention, as represented by Formula I, are produced by a combination of known method steps, as for example from the corresponding 3-hydroxy-5-dehydro-, 3-acyloxy-5-dehydro-, or 3-keto-5-dehydro-steroids, or from halogenated 3-keto-steroids. In the 3-keto-5-dehydro steroids the 3-keto group can be present in a functionally altered form. For the production of 1-dehydro derivatives, the 7-alkoxy steroids of Formula I which are saturated in the 1,2-position can be used as starting materials.

For example, the following methods can be used in this invention:

(a) A 5-dehydro-7-alkoxy-17α-alkyl steroid of Formula II

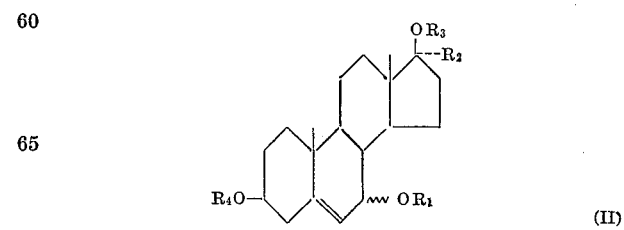

(II)

wherein $R_1$, $R_2$ and $R_3$ have the meanings previously indicated, and $R_4$ is hydrogen or acyl of up to 7 carbon atoms,
in which the 3-acyl group may be saponified if necessary,
is treated with a mild oxidizing agent or with microorganisms which can convert a hydroxyl group of the steroid into a keto group, and, if necessary, saponify the steroid ester groups. The same reaction can also be produced by the same microorganisms which are generally used for the formation of double bonds in the 1,2 position in steroids.

(b) Furthermore, a 3-keto-7-alkoxy-17α-alkyl steroid of the Formula III

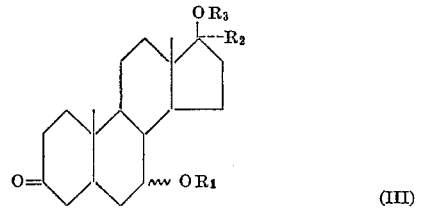

wherein $R_1$, $R_2$ and $R_3$ have the previously indicated meanings in which there is a halogen atom in the 4 or 5 position, can be dehydrohalogenated by known methods, or (c) In a 3-keto-5-dehydro-7-alkoxy-17α-alkyl steroid of Formula IV

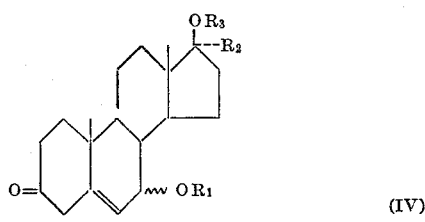

wherein $R_1$, $R_2$, and $R_3$ have the previously indicated meaning after isomerization by a known method, preferably with treatment with an alkaline or acidic material or with iodine, the 5,6 double bond is shifted to the 4,5 position. Furthermore, by the use of acidic isomerizing agents, the keto group can be given a functionally altered form.

(d) The 1-dehydro derivatives of Formula I can be produced either from the corresponding derivatives that are saturated in the 1,2 position, or from compounds of Formula II in which the acylated hydroxyl groups in the 3-position may have been previously saponified, by treatment of such derivatives or compounds with chemical or microbiological dehydrogenating agents.

(e) The 1-dehydro derivatives of Formula I can also be produced from a steroid of Formula V

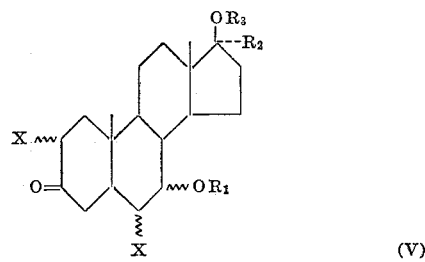

wherein $R_1$, $R_2$, and $R_3$ have the meanings given above and X is Cl, Br or I by treatment with dehydrohalogenating agents.

(f) It is also possible according to this invention on the one hand to esterify, by known methods, a free hydroxyl group in the 17β position of the end product, or on the other hand to liberate a functionally altered hydroxyl group in this position by known methods.

The above methods will now be described more in detail.

(a) For process (a), there may be employed, for example, the following starting materials:

7-methoxy-17α-methyl (or 17α-ethyl)-5-androstene-3β,17β-diol;
7-ethoxy-17α-methyl-5-androstene-3β,17β-diol;
7-propoxy-17α-methyl-5-androstene-3β,17β-diol;
7-methoxy-17α-methyl-5-androstene-3β,17β-diol-3-formate;
7-methoxy-17α-ethyl-5-androstene-3β,17β-diol-3-benzoate;
7-methoxy-17α-methyl-5-androstene-3β,17β-diol-17-acetate;
7-methoxy-17α-methyl-5-androstene-3β,17β-diol-3,17-diformate;
7-isopropoxy-17α-methyl-5-androstene-3β,17β-diol-17-caproate The oxidation of the starting materials of Formula II for the production of compounds I can be effected in a known manner with mild oxidizing agents by an Oppenauer reaction. For this purpose the compounds II are heated with a suitable solvent such as benzene, toluene or xylene, together with a suitable catalyst such as aluminum tertiary butylate, aluminum isopropylate, or aluminum phenolate, and a hydrogen acceptor such as acetone, cyclohexanone or quinone, the heating being continued until the reaction has completely terminated. Although the oxidation reaction will occur in the presence of only small amounts of aluminum alcoholate, it is preferable to use the aluminum compound in larger amount. It is also advantageous to use an excess of the hydrogen acceptor. It is also possible to carry out the oxidation without any added solvent, using only the catalyst in cyclohexanone.

The starting materials of the general Formula II can also be converted into the desired end products of Formula I by microbiological methods. For this purpose use is made of those microorganisms which will oxidize the free hydroxyl groups of a steroid into keto groups and which are able at the same time to saponify a steroid ester group. Such a microorganism is, for example, *Flavobacterium dehydrogenans*. As a nutrient solution for such organisms, and especially for *Flavobacterium dehydrogenans*, use can be made of an aqueous solution of 1% yeast extract to which has been added a Sorensen phosphate buffer to give it a pH of 6.8. A 24-hour-old culture of, for example, *Flavobacterium dehydrogenans* is allowed to grow in this about 10 hours at about 28° C. with vigorous stirring and aeration, after which compound II is added. Incubation is then continued for several hours. The reaction product can then be extracted with chloroform.

The same reaction can also be carried out under mild conditions with dehydrogenating microorganisms for the 1,2-position, and especially with *Bacillus sphaericus* var. *fusiformis*, *Corynebacterium simplex* and *Fusarium solani*. Generally, however, such microorganisms are used only in cases where it is also necessary to form a 1,2 double bond, as when the 1,4-androstadiene of Formula I is to be produced.

(b) For method (b), the following are preferably used as the starting materials—

5-chloro- or 5-bromo-7-methoxy-17α-methyl-androstane-3-one-17β-ol
5-bromo-7-methoxy-17α-ethyl-androstane-3-one-17β-ol
5-bromo-7-methoxy-17α-methyl-androstane-3-one-17β-ol-17-acetate
5-iodo-7-methoxy-17α-methyl-androstane-3-one-17β-ol-17-acetate
4-chloro- or 4-bromo-7-methoxy-17α-methyl-androstane-3-one-17β-ol
4-bromo-7-methoxy-17α-ethyl-androstane-3-one-17β-ol
4-iodo-7-methoxy-17α-ethyl-androstane-3-one-17β-ol For dehydrohalogenating the compounds of Formula III which are halogenated in the 4 or 5 position, they are dissolved in a solvent such as benzene, toluene, dioxane or cyclohexane, and are then treated with an acid-binding material such as potassium hydroxide, sodium hydroxide, sodium carbonate, collidine or pyridine, preferably while being warmed.

(c) As starting materials for substances of the type (c), the following compounds may be used:

7-methoxy-17α-methyl-(or 17α-ethyl)-5-androstene-3-one-17β-ol
7-ethoxy-17α-methyl-5-androstene-3-one-17β-ol
7-ethoxy-17α-ethyl-5-androstene-3-one-17β-ol For the conversion of the starting material of Formula IV into the end products of Formula I, any isomerization method can be used which will shift a double bond from the β-position to the α-position relative to the carbonyl group, so that it will be in a conjugated position relative to the carbonyl group.

As isomerizing agents, either alkaline or acidic materials can be used. As examples of alkaline catalysts, either sodium hydroxide or sodium bicarbonate can be used. As examples of acid catalysts, carboxylic acids such as oxalic acid are suitable. In this case the reaction is preferably conducted in the presence of light. The isomerization is preferably conducted in the presence of an inert solvent such as benzene, toluene, cyclohexane or dioxane. The reaction mixture is generally heated a short time, and if necessary under reflux.

If an acid catalyst is used, then the starting material can be a steroid of Formula IV in which the keto group is in the 3-position, in a functionally altered form. For example, the corresponding 3-enolether, 3-enolthioether, 3-enolester, 3-enolthioester, 3-enamine, 3-ketoacetal or 3-ketothioacetal can be used in the isomerization process. The functionally altered keto group which enters into this reaction will then be liberated.

(d) The steroids of Formula I which are saturated in the 1,2 position can be converted into the corresponding dehydrogenated derivatives by treatment with chemical or microbiological 1,2 dehydrogenating agents in a known manner.

Suitable chemical dehydrogenating agents are 2,3-dichloro-5,6-dicyano-p-benzoquinone or selenium dioxide. Dehydrogenation with 2,3 - dichloro - 5,6-dicyano-p-benzoquinone is preferably performed in a solvent with a boiling point of 30 to 150° C. Suitable solvents are ethanol, butanol, tertiary butanol, ethyl acetate, glacial acetic acid, dioxane, tetrahydrofuran, benzene or acetone. If necessary, a small amount of nitrobenzene can be added to the reaction mixture. The reaction is generally carried out at the boiling temperature of the solvent. The reaction time is from 5 to 48 hours.

Dehydrogenation with selenium dioxide is similarly conducted in a suitable solvent such as tertiary butanol, ethyl acetate, or tertiary amyl alcohol. The reaction can be accelerated by the addition of small amounts of glacial acid, and is generally completed after 48 hours at the most. The 1,2 dehydrogenation product is separated from the solution in a known manner after removal of the precipitated selenium.

The microbiological 1,2 dehydrogenation can be performed with any suitable species of microorganism. Especially suitable for the microbiological 1,2 dehydrogenation are *Bacillus sphaericus* var. *fusiformis, Corynebacterium simplex* and *Fusarium solani*. In the microbiological 1,2 dehydrogenation, a submerged culture of the proper mircroorganism is introduced into the starting material where it will be kept at optimum temperature in an aerated nutrient solution and allowed to grow. Instead of a growing culture, use can also be made of a suspension in a buffer solution. The reaction is followed by chromatography, and after the reaction has ended, the product is extracted, for example with chloroform.

By the use of 1,2-dehydrogenation microorganisms, the 1-dehydrogenated derivatives of Formula I of this invention can also be produced from the starting material II. The hydroxyl group that is in the 3-position of Formula II, if in the form of the 3-acyloxy group, is saponified before treatment by the microorganisms. The hydroxyl group is then microbiologically oxidized to a 3-keto group, with the simultaneous production of a 4,5 and a 1,2 double bond.

(3) In a further example of this invention, the halogenated steroids of Formula V can be used as starting materials for conversion into the 1,4-bis-dehydro-steroids of Formula I by removal of hydrogen halide. This is accomplished by heating the halogenated steroid with an acid binding agent such as an inorganic metal hydroxide like potassium hydroxide or sodium hydroxide, an alkaline reacting salt such as sodium carbonate, or an organic base such as pyridine or collidine in an inert solvent such as toluene or xylene; or by heating in a polar solvent like dimethylformamide in the presence of lithium carbonate and lithium chloride or bromide. Suitable solvents are, for example, aromatic or cycloaliphatic hydrocarbons like benzene or cyclohexane, as well as dioxane or tetrahydrofuran.

(f) After the 17-hydroxy group of the compound of Formula I is esterified, it can, if desired, be converted into a free hydroxyl group by saponification. As a saponifying agent, an aqueous solution of sodium or potassium hydroxide or sodium bicarbonate can be used. It may also be advantageous to work in the absence of molecular oxygen.

Alternatively, a free hydroxyl group in the 17-position can be esterified in the usual manner. As esterification agents, alkane carboxylic acids with up to 6 C-atoms or suitable derivatives thereof can be used, such as acetic acid, propionic acid, butyric acid, trimethylacetic acid or caproic acid.

The substances to be used as starting materials can be derived from dehydro-epi-androsterone-3-acylates. Dehydro-epi-androsterone and its 3-acylates can be converted in a known manner, as for example by bromination, into the corresponding 7-bromo-derivatives, and these can be converted into the corresponding 7-hydroxy compounds by a method similar to that described in Recueil, vol. 66, p. 83 (1947). By suitable etherification as with diazomethane, followed by Grignardization of the 17-keto-group, the starting materials of Formula II can be obtained.

By attachment of a hydrogen halide to the 5,6 double bond of the 3-hydroxy-5-dehydro compounds, with subsequent oxidation of the 3-hydroxyl group with chromic acid, the starting materials of Formula III can be obtained. The starting materials of Formula IV can be made from the compounds of Formula II by oxidation with chromic acid under non-isomerizing conditions as, for example, in pyridine.

The starting materials of Formula V can be produced from the compounds of Formula II. After catalytic hydrogenation of the 5,6 double bond, the 3-hydroxyl group is oxidized in a known manner to a keto group. By subsequent halogenation, as by treatment with bromine in glacial acetic acid, the 2,4 dihalogen steroids of Formula V are obtained.

In producing the final products of this invention, it is necessary to prepare novel intermediates therefor. Such intermediates are:

5-androstene-3β-7-diol-17-one
7-methoxy-5-androstene-3β-ol-17-one
7-ethoxy-5-androstene-3β-ol-17-one
7-propoxy-5-androstene-3β-ol-17-one
7-isopropoxy-5-androstene-3β-ol-17-one and the 3-acylates of these compounds, particularly the 3-acetates and 3-benzoates.

Without further elaboration, it is believed that the preceding description will enable one skilled in the art to practice this invention to its fullest extent. It is to be understood, therefore, that the following preferred embodiments of this invention are merely exemplary in nature, and are not to be construed as limitative of the remainder of the specification or appended claims in any way whatsoever.

*Example 1*

2.8 g. 7-methoxy-17α-methyl-5-androstene-3β,17β-diol are dissolved in 200 ml. benzene and 28 ml. cyclohexanone. From this solution about 50 ml. benzene are distilled off. A solution of 4 g. aluminum isopropylate in 20 ml. absolute benzene is added. The reaction mixture is then boiled 90 minutes under reflux, the superfluous cyclohexanone driven off by distillation with steam, and the steroid then extracted by repeated shaking with chloroform. The dried chloroform extracts are concentrated under vacuum. The concentrate is purified by adsorption in a column filled with silicon dioxide, and subsequent purification by elution with benzene/chloroform. The middle eluated fractions are combined and concentrated under vacuum. The resulting 7-methoxy-17α-methyl-4-androstene-17β-ol-3-one is recrystallized from ether/petroleum ether. M.P. 157–158° C; $(\alpha)_D + 10°$ (chloroform);

$\lambda_{max.}$ 243 m$\mu$, $E_{1cm.}^{1\%}$ 461

IR bands at 1663, 1618 and 1087 cm.$^{-1}$.

*Example 2*

2.8 g. 7 - ethoxy - 17α-methyl-5-androstene-3β,17β-diol are oxidized with aluminum isopropylate in benzene/cyclohexanone as in Example 1. The 7-ethoxy-17α-methyl-4 - androstene - 17β-ol-3-one separates as white crystals. M.P. 156–157° C.; $(\alpha)_D^{24} + 77.4°$ (chloroform);

$\lambda_{max.}$ 244 m$\mu$, $E_{1cm.}^{1\%}$ 424

IR bands at 1663, 1618 and 1092 cm.$^{-1}$.

*Example 3*

3.68 g. 7 - methoxy-5α-chloro-17α-methyl-androstane-17β-ol-3-one are added in small portions to a boiling solution of 1.33 g. 2,4,6-collidine in 50 ml. toluene during agitation and the boiling continued 30 minutes under reflux. The precipitated 2,4,6-collidine hydrochloride is filtered off, and the filtrate evaporated to dryness under vacuum. Yield 2.8 g. (84% theoretical). After repeated recrystallization of the residue from ether/methanol, the pure 7-methoxy-17α-methyl-4-androstene-17β-ol-3-one is obtained. M.P. 157–158° C.; $(\alpha)_D + 10°$ (chloroform);

$\lambda_{max.}$ 243 m$\mu$, $E_{1cm.}^{1\%}$ 461

IR bands at 1663, 1618, and 1087 cm.$^{-1}$.

*Example 4*

3.3 g. 7 - methoxy-17α-methyl-5-androstene-17β-ol-3-one are dissolved in 50 ml. ethanol and are then reacted with 3 g. oxalic acid The mixture is then warmed 15 minutes to 50–60° C., poured into a liter of cold water, and the precipitated steroid filtered off. Yield 2.5 g. (75% theoretical). By recrystallization from ether/methanol, pure 7-methoxy-17α-methyl-4-androstene-17β-ol-3-one is obtained. M.P. 157–158° C.; $(\alpha)_D + 10°$ (chloroform);

$\lambda_{max.}$ 243 m$\mu$, $E_{1cm.}^{1\%}$ 461

IR bands at 1663, 1618 and 1087 cm.$^{-1}$.

*Example 5*

A small fermenter containing 15 liter nutrient solution (0.1% yeast extract in 1/30 molar phosphate buffer solution of Sorensen, pH 6.8) is inoculated with 800 ml. of a submerged culture of *Corynebacterium simplex*, and is strongly aerated with agitation at 28° C. After about 6 hours, 7.5 g. 7-methoxy-17α-methyl-4-androstene-17β-ol-3-one in 300 ml. methanol are added. The reaction is followed by thin layer chromatography and terminates after about 12 hours. The culture solution is extracted three times with chloroform, using 15 liter each time. The extract is concentrated and purified by passage through a column of silica gel. After recrystallization from ether, pure 7-methoxy-17α-methyl-1,4-androstadiene-17β-ol-3-one is obtained. M.P. 127–128° C.; $(\alpha)_D^{24} - 69.6°$ (chloroform);

$\lambda_{max.}$ 244–245 m$\mu$, $E_{1cm.}^{1\%}$ 450

IR bands at 1664, 1633 and 1090 cm.$^{-1}$.

*Example 6*

By analogy to Example 5, 7.5 g. 7-ethoxy-17α-methyl-4-androstene-17β-ol-3-one are dehydrogenated with a submerged culture of *Corynebacterium simplex*, producing a 51% yield of 7-ethoxy-17α-methyl-1,4-androstadiene-17β-ol-3-one.

$\lambda_{max.}$ 244–245 m$\mu$, $E_{1cm.}^{1\%}$ 450

IR bands at 1664, 1633, 1611 and 1091 cm.$^{-1}$.

*Example 7*

Under the conditions of Example 5, 7.5 g. 7-methoxy-17α-methyl-5-androstene-3β,17β-diol are dehydrogenated with a submerged culture of *Corynebacterium simplex*. The conversion is completed after about 11 hours. There is obtained 4.2 g. 7-methoxy-17α-methyl-1,4-androstadiene-17β-ol-3-one (57% theoretical). M.P. 127–128° C.;

$\lambda_{max.}$ 244 m$\mu$, $E_{1cm.}^{1\%}$ 450

*Example 8*

8.27 g. 4 - chloro - 7-methoxy-17α-methyl-androstane-17β-ol-3-one are added with vigorous stirring to a boiling solution of 2.65 g. dimethylaniline in 150 ml. toluene and the boiling continued 30 minutes under reflux. The precipitated dimethylaniline hydrobromide is filtered off, and the filtrate concentrated to dryness under diminished pressure. Yield 6.2 g. After recrystallization of the crude product from ether or methanol/water, and also with chromatographic purification if necessary, there is obtained pure 7 - methoxy-17α-methyl-4-androstene-17β-ol-3-one. M.P. 157–158° C.; $(\alpha)_D^{24} + 11°$ (chloroform).

*Example 9*

5 g. 2,4 - dibromo - 7-methoxy-17α-methyl-androstane-17β-ol-3-one are dissolved or suspended with 2.22 g. lithium carbonate and 2.57 g. lithium bromide in 50 ml. dimethyl formamide. The mixture is then heated 15 hours to 130° C. with continual stirring under nitrogen. The mixture, after being cooled, is poured into 300 ml. water to which 23 ml. glacial acetic acid has been added. The mixture is extracted three times with methylene chloride. The combined extracts are washed vigorously with water, dried, and separated from the solvent under diminished pressure. The residue is purified chromatographically over silica gel and recrystallized from ether. The product is 7-methoxy-17α-methyl-1,4-androstadiene-17β-ol-3-one. M.P. 127–128° C.; $(\alpha)_D^{24} - 69.6°$ (chloroform).

*Example 10*

2.0 g. 7 - methoxy - 17α-methyl-4-androstene-17β-ol-3-one are dissolved in 20 m. absolute pyridine and 7.7 ml. propionic anhydride, and the solution then heated 4 hours to 130° C. After being allowed to cool, the mixture is further cooled with ice and is poured with stirring into 20 ml. of a 5% HCl solution. The precipitate is vacuum filtered, washed thoroughly with water, and dried under diminished pressure. After being redissolved in ether/methanol, pure 7 - methoxy - 17α - methyl-4-androstene-17β-ol-3-one-17-propionate is obtained.

$\lambda_{max.}$ 242.5 m$\mu$, $E_{1cm.}^{1\%}$ 401

M.P. 203–204° C.; $(\alpha)_D^{24} + 23.8°$ (chloroform); IR bands at 1723, 1664, 1617, 1190 and 1087 cm.$^{-1}$.

Example 11

By analogy to Example 1, 3.1 g. 7-isopropoxy-17α-methyl-5-androstene-3β,17β-diol-17-caproate are converted into 7-isopropoxy-17α-methyl-4-androstene-17β-ol-3-one-17-caproate.

$\lambda_{max.}$ 243 m$\mu$, $E_{1cm.}^{1\%}$ 390

Example 12

(a) By analogy to Example 1, from 7-propoxy-17α-methyl-5-androstene-3β,17β-diol there is obtained 7-propoxy-17α-methyl-4-androstene-17β-ol-one, which is then recrystallized from ether.

$\lambda_{max.}$ 243 m$\mu$, $E_{1cm.}^{1\%}$ 435

(b) 15 liter of a nutrient solution of 1% yeast extract, pH 6.8, are inoculated with 0.5 liter of a culture of *Bacillus sphaericus*. The culture is allowed to grow while being continually agitated and aerated at 28° C. After about 10 hours, there is added to it 7.8 g. 7-propoxy-17α-methyl-4-androstene-17β-ol-3-one in 280 ml. methanol. The dehydrogenation is followed by thin layer chromatography and is completed after about 28–36 hours. The reaction mixture is extracted three times with chloroform and the combined chloroform extracts are evaporated down. The 7-propoxy-17α-methyl-1,4-androstadiene-17β-ol-3-one thus obtained, is recrystallized from ether.

$\lambda_{max.}$ 244 m$\mu$, $E_{1cm.}^{1\%}$ 445

Example 13

10 liters of nutrient solution containing 1% yeast extract and 1/16 mole of Sorensen's phosphate buffer at pH 6.8 is inoculated with 400 ml. of a culture of *Flavobacterium dehydrogenans*. After growing the culture 10 hours at 28° C. with vigorous stirring and aeration, a solution of 5 g. 7-ethoxy-17α-methyl-5-androstene-3β,17β-diol in 150 cc. methanol is added. The incubation and aeration is continued 6 hours. After about 8 hours, no more of the starting material can be detected by thin layer chromatography. The reaction mixture is thoroughly extracted with chloroform. The combined extracts are dried and concentrated. The 7-ethoxy-17α-methyl-4-androstene-17β-ol-3-one thus obtained is recrystallized from ether/petroleum ether. M.P. 156–157° C.

Example 4

3 g. 7-propoxy-17α-methyl-4-androstene-17β-ol-3-one-17-tert. butylacetate are dissolved in 150 ml. tert. butanol, and are reacted with 1.5 ml. acetic acid and 1 g. selenium dioxide. The reaction mixture is boiled 48 hours under reflux, another gram of selenium dioxide being added after 24 hours of boiling. The solvent is evaporated under reduced pressure, and the residue dissolved in ethyl acetate and washed to the neutral point. After chromatographic purification over silica gel, the 7-propoxy-17α-methyl-1,4-androstadiene-17β-ol-3-one-17-tert. butylacetate is recrystallized from ether.

$\lambda_{max.}$ 244 m$\mu$, $E_{1cm.}^{1\%}$ 405

Example 15

3.5 g. 7-ethoxy-17α-methyl-4-androstene-17β-ol-3-one-17-acetate are dissolved in 70 ml. dioxane and are reacted with 3.5 g. 2,3-dichloro-5,6-dicyano-p-benzoquinone. The reaction mixture is boiled 6 hours under reflux, then diluted with chloroform, and then washed several times successively with 30 ml. of a one-normal sodium hydroxide solution and with water. The solution is dried over sodium sulfate and evaporated down. The residue of 7-ethoxy-17α-methyl-1,4-androstadiene-17β-ol-3-one-17-acetate is recrystallized from ether-petroleum ether.

$\lambda_{max.}$ 243–245 m$\mu$, $E_{1cm.}^{1\%}$ 452

Example 16

The following composition is a preferred embodiment of a pharmaceutical preparation embodying the novel steroids of this invention.

*Tablets.*—Each tablet contains:

| | Mg. |
|---|---|
| 7-methoxy-17α-methyl-androstene-17β-ol-3-one | 5 |
| Lactose | 150 |
| Starch | 15 |
| Magnesium stearate | 2 |
| Talc | 10 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. 7-methoxy-17α-methyl-4-androstene-3-one-17β-ol.

2. An anabolically active pharmaceutical composition in unit dosage form comprising a pharmaceutical carrier and about 1–10 mg. of 7-methoxy-17α-methyl-4-androstene-3-one-17β-ol.

3. A method of effecting anabolic activity in mammals, which method comprises administering to said mammals an effective dosage of 7-methoxy-17α-methyl-4-androstene-3-one-17β-ol.

References Cited by the Examiner

UNITED STATES PATENTS 2,479,966  8/49  Reichstein _____ 260—397.4
2,960,436  11/60  Thoma et al. _____ 195—51

OTHER REFERENCES

Schwarz, "Coll. Czech. Chem. Comm.," August 1961, pages 1958–1967.

LEWIS GOTTS, *Primary Examiner.*

UNITED STATES PATENT OFFICE
CERTIFICATE OF CORRECTION

Patent No. 3,210,249            October 5, 1965

Wolfgang Beerstecher et al.

It is hereby certified that error appears in the above numbered patent requiring correction and that the said Letters Patent should read as corrected below.

Column 3, formula "V" should appear as shown below instead of as in the patent:

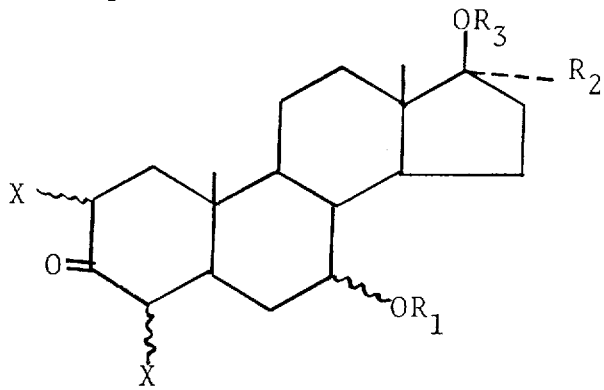

column 5, line 57, before "acid" insert -- acetic --; column 9, line 11, for "17β-ol-one" read -- 17β-ol-3-one --.

Signed and sealed this 24th day of May 1966.

(SEAL)
Attest:

ERNEST W. SWIDER            EDWARD J. BRENNER
Attesting Officer            Commissioner of Patents